(12) United States Patent (10) Patent No.: US 6,954,695 B2
Bonilla et al. (45) Date of Patent: *Oct. 11, 2005

(54) APPARATUS SYSTEM AND METHOD FOR REMOTELY CONTROLLING A VEHICLE OVER A NETWORK

(75) Inventors: Victor G. Bonilla, Scottsdale, AZ (US); Logan M. Fanjoy, Phoenix, AZ (US); James W. McCabe, Scottsdale, AZ (US)

(73) Assignee: Racing Visions, LLC, Scottsdale, AZ (US)

( * ) Notice: Subject to any disclaimer, the term of this patent is extended or adjusted under 35 U.S.C. 154(b) by 306 days.

This patent is subject to a terminal disclaimer.

(21) Appl. No.: 10/356,699

(22) Filed: Jan. 31, 2003

(65) Prior Publication Data

US 2004/0019413 A1 Jan. 29, 2004

Related U.S. Application Data

(60) Provisional application No. 60/374,440, filed on Apr. 22, 2002, and provisional application No. 60/353,642, filed on Jan. 31, 2002.

(51) Int. Cl.[7] .................. G01C 21/26; G01C 21/28; G01C 21/30; G01C 21/32; G01C 21/34
(52) U.S. Cl. .................. 701/200; 701/117; 701/201; 701/202; 701/205; 701/206; 701/207; 701/213; 701/29; 701/66; 701/353; 348/211.2; 340/439; 340/825.69; 342/457; 455/456.6
(58) Field of Search .................. 701/200, 117, 701/201, 202, 205–207, 213, 29, 33, 353; 348/211.2; 340/439, 825.69; 342/457; 455/456.6

(56) References Cited

U.S. PATENT DOCUMENTS

| | | | |
|---|---|---|---|
| 4,330,830 A | * | 5/1982 | Perry .................. 701/117 |
| 4,817,948 A | | 4/1989 | Simonelli .................. 273/86 |
| 4,819,226 A | * | 4/1989 | Beckner et al. .................. 370/458 |
| 4,833,671 A | * | 5/1989 | Beckner et al. .................. 370/429 |
| 4,893,306 A | * | 1/1990 | Chao et al. .................. 370/458 |
| 4,986,187 A | | 1/1991 | Booth et al. .................. 104/84 |
| 5,015,189 A | | 5/1991 | Wenzinger, Jr. .................. 434/63 |
| 5,016,004 A | | 5/1991 | Funk et al. .................. 340/825.69 |
| 5,044,956 A | | 9/1991 | Behensky et al. .................. 434/45 |
| 5,338,247 A | | 8/1994 | Miles .................. 446/456 |
| 5,456,604 A | | 10/1995 | Olmsted et al. .................. 434/62 |

(Continued)

FOREIGN PATENT DOCUMENTS

| | | | |
|---|---|---|---|
| GB | 2 128 842 | 5/1984 | ............ H04N/7/18 |
| WO | WO 03/089998 A1 | * 10/2004 | |

OTHER PUBLICATIONS

Ottavi et al., Development of a dynamic routing system for a fault tolerant solid state mass memory, The 2001 IEEE International Symposium on , vol.: 4 , May 6–9, 2001, pp.: 830–833 vol. 4.*

*Primary Examiner*—Thomas G. Black
*Assistant Examiner*—McDieunel Marc
(74) *Attorney, Agent, or Firm*—Kunzler & Associates (57) ABSTRACT

A system and a method for controlling a vehicle remotely over a network are disclosed. A vehicle is provided with a vehicle control module configured to transmit and receive network communications containing vehicle control data. In one embodiment, the vehicle control module is configured to transmit and receive network switched packets wirelessly. Additionally, the vehicle may comprise one or more cameras configured to transmit a two dimensional, three dimensional, or 360° panoramic view from the vehicle. The network comprises a user station, a server, and at least one vehicle to be controlled. The user station may comprise an operator booth that resembles the driving compartment of a vehicle. Alternatively, the user station may comprise a portable control device.

36 Claims, 6 Drawing Sheets

U.S. PATENT DOCUMENTS

| | | | |
|---|---|---|---|
| 5,481,257 A | 1/1996 | Brubaker et al. | 340/825.69 |
| 5,596,319 A | 1/1997 | Spry | 340/903 |
| 5,707,237 A | 1/1998 | Takemoto et al. | 434/69 |
| 5,771,008 A * | 6/1998 | Hayashi et al. | 340/905 |
| 5,989,096 A | 11/1999 | Barton et al. | 446/425 |
| 6,074,271 A | 6/2000 | Derrah | 446/457 |
| 6,113,459 A | 9/2000 | Nammoto | 446/454 |
| 6,141,145 A | 10/2000 | Nalwa | 395/403 |
| 6,247,994 B1 | 6/2001 | DeAngelis et al. | 446/454 |
| 6,309,306 B1 | 10/2001 | Geagley et al. | 472/60 |
| 2001/0026386 A1 | 10/2001 | Yamamoto et al. | 359/142 |
| 2001/0045978 A1 | 11/2001 | McConnell et al. | 348/42 |
| 2003/0220723 A1 * | 11/2003 | Bonilla et al. | 701/2 |
| 2003/0231244 A1 * | 12/2003 | Bonilla et al. | 348/211.2 |
| 2003/0233449 A1 * | 12/2003 | Bonilla et al. | 709/224 |
| 2004/0005927 A1 * | 1/2004 | Bonilla et al. | 463/42 |
| 2004/0077285 A1 * | 4/2004 | Bonilla et al. | 446/491 |
| 2004/0147202 A1 * | 7/2004 | Brabrand | 446/454 |

* cited by examiner

APPARATUS SYSTEM AND METHOD FOR REMOTELY CONTROLLING A VEHICLE OVER A NETWORK

RELATED APPLICATIONS

This application is a Continuation-In-Part of and claims priority to U.S. Provisional Patent Application Ser. No. 60/353,642, filed on Jan. 31, 2002 for Racing Visions, L.L.C., and for Provisional Patent Application Ser. No. 60/374,440 filed on Apr. 22, 2002 for Racing Visions, L.L.C.

BACKGROUND OF THE INVENTION

The Field of the Invention

Remotely controlling scaled vehicles has been a popular hobby for many years. Children and adults are fascinated by the opportunity to control vehicles that normally are not available for use, such as military vehicles or trains. Scale replicas of racecars, boats, submarines, dune buggies, monster trucks, and motorcycles are among the vehicles that are widely available for remote control enthusiasts.

Modelers and manufacturers of scaled vehicles put forth considerable time and effort to attain a scaled vehicle with a life-like appearance. For many, great pleasure is derived from controlling a realistically scaled vehicle. Many methods have been developed to control scaled vehicles. Control mechanisms exist that utilize a physical connection, such as a cable, between the vehicle and the controller. This simple control mechanism is relatively inexpensive and easy to implement but requires that the user follow the vehicle. To overcome these limitations, radio control, or R/C, mechanisms have been developed.

Radio controllers facilitate the control of a vehicle through radio transmissions. By breaking the physical link between the vehicle and controller, R/C enthusiasts are able to participate in organized group events such as racing or with friends in what is known as "backyard bashing." Additionally, R/C controllers have allowed scaled vehicles to travel over and under water, and through the air, which for obvious reasons was not previously possible with a cabled control mechanism.

Racing scaled versions of NASCAR™, Formula 1™, and Indy™ series racecars has become very popular because, unlike other sports, the public generally does not have the opportunity to race these cars. Although scaled racecars give the hobbyist the feeling of racing, for example, a stock car, remotely racing a scaled racecar may lack realism. In order to make a racecar visually interesting to the point of view of the racer, the racecar is normally operated at speeds that if scaled are unrealistic. Additionally R/C is limited by the amount of channels or frequencies available for use. Currently, operators of racing tracks or airplane parks must track each user's frequency, and when the limited number of the available channels are being used, no new users are allowed to participate.

A solution to this problem has been to assign a binary address to each vehicle in a system. Command data is then attached to the binary address and transmitted to all vehicles in the system. In an analog R/C environment, commands to multiple vehicles must be placed in a queue and transmitted sequentially; this presents a slight lag between a user control and response by the vehicle. Each vehicle constantly monitors transmitted commands and waits for a command with the assigned binary address. Limitations to this system include the loss of fine control of vehicles due to transmit lag, and ultimately the number of vehicles is limited because the time lag could become too great.

Accordingly, it is apparent that a need exists for an improved system of controlling vehicles remotely that accords fine-tuned control capabilities and increased support for multiple vehicles.

BRIEF SUMMARY OF THE INVENTION

The network controlled vehicle of the present invention has been developed in response to the present state of the art, and in particular, in response to the problems and needs in the art that have not yet been fully solved by currently available remote controlled vehicles. Accordingly, the present invention provides a network controlled vehicle that overcomes many or all of the above-discussed shortcomings in the art.

In accordance with the invention as embodied and broadly described herein in the preferred embodiments, an improved remote control vehicle is provided and configured to move in a direction selectable remotely by a user. The vehicle comprises a chassis configured to move about in response to vehicle control data from a user; a controller residing within the chassis configured to receive network switched packets containing the vehicle control data; and an actuator interface module configured to operate an actuator in response to the vehicle control data received by the controller.

The controller is configured to transmit vehicle data feedback to a user. Additionally, the controller may comprise a wireless network interface connection configured to transmit and receive network switched packets containing vehicle control data. The controller may also be configured to transmit a two dimensional, three dimensional, or 360° three dimensional view to the user.

The present invention also comprises a station from which a vehicle is remotely controlled. The station may comprise a vehicle control module configured to generate vehicle control data in response to input from a user, and a transmission module configured to communicate with the vehicle control module and transmit network switched packets containing the vehicle control data over a transmission medium to the vehicle.

In one embodiment the station comprises an operator booth configured to resemble the driving compartment of a race car. In order to generate vehicle control data, a steering mechanism may be provided. Alternatively, a vehicle station control may comprise a steering mechanism, a gear shift mechanism, a brake pedal, a clutch pedal, and an acceleration pedal. The control stations may additionally include a clutch pedal and a gear shift paddle corresponding to the type of actual vehicle that the scaled vehicle is meant to resemble. The vehicle control station may be stationary or configured as a portable control device. In one embodiment the vehicle control station is configured to transmit and receive network switched packets in a peer-to-peer environment. The vehicle control station may be configured to transmit and receive network switched packets in an ad-hoc environment, or in an infrastructure environment.

A control apparatus for a vehicle controllable remotely over a network is also provided. The control apparatus comprises a network interface connection configured to transmit and receive vehicle control data, a central processing unit configured to provide vehicle control data to the network interface connection, and an actuator interface module configured to receive vehicle control data from the central processing unit. In one embodiment, the control apparatus comprises a video interface module configured to communicate visual data to the central processing unit. One or more video cameras may also be provided and configured to provide visual data to the video interface module. The video interface module is preferably configured to transmit a two dimensional, three dimensional, 360° three dimensional view. The video signal may be transmitted over the network or by other wireless protocols.

In order to facilitate flexibility of device control within the network, the control apparatus may be provided with a Simple Network Management Protocol (SNMP) interface module residing within the central processing unit configured to operate an actuator. Alternately, the apparatus may be employed using a web-based protocol, such as Java™.

The network to control the vehicle comprises at least one network interface connection and a server configured to communicate with a central processing unit of a mobile vehicle over the network. In one embodiment, the server is configured to communicate with a vehicle control station. The vehicle may transmit and receive vehicle control data through a wireless access point configured to communicate with a central processing unit of a mobile vehicle.

In order to monitor vehicle usage, a track marshal module may be provided and configured to adjust such properties as speed, acceleration, braking, and steering. The track marshal module may also be configured to override user controls.

The present invention also comprises a method of controlling a mobile vehicle over a digital data network, including but not limited to a LAN, WAN, satellite, and digital cable networks. The method comprises providing a mobile vehicle configured to transmit and receive vehicle control data over the network, providing a central server configured to transmit and receive vehicle control data, transmitting vehicle control data, controlling the mobile vehicle in response to the transmitted vehicle control data, and receiving vehicle feedback data from the vehicle. Transmitting vehicle control data may comprise transmitting network switched packets in a peer-to-peer environment or in an infrastructure environment.

These features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
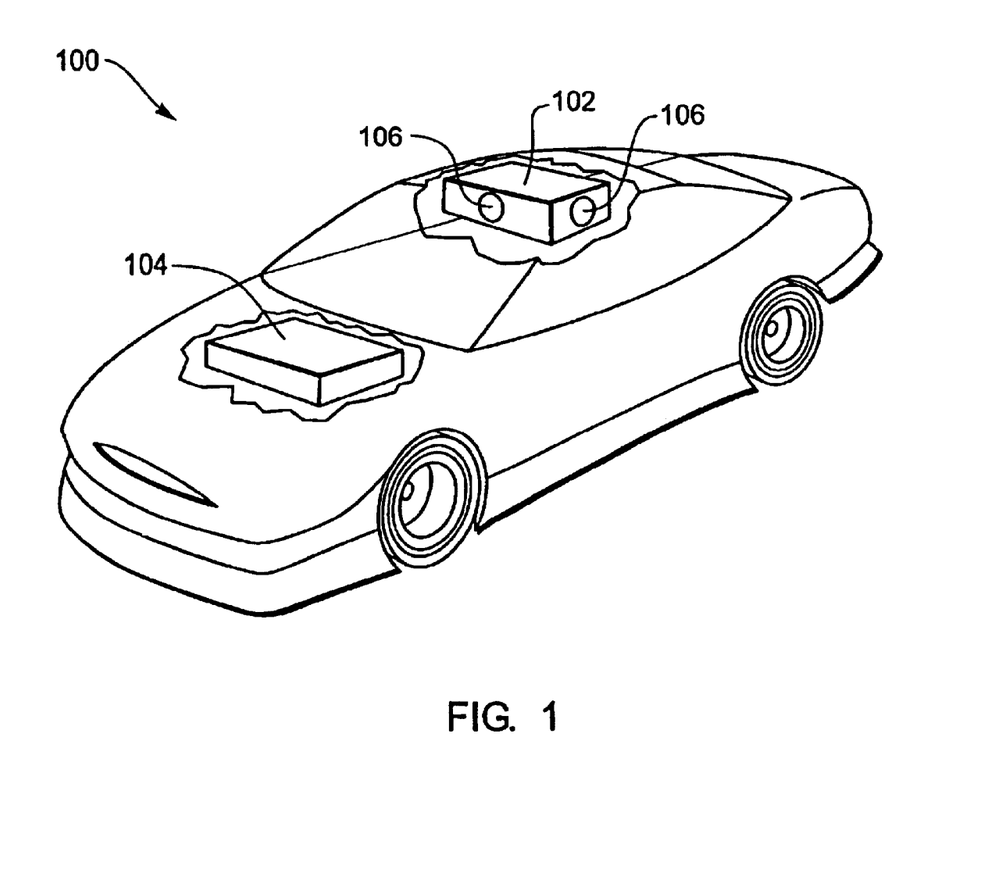
FIG. 1 is a perspective view of one embodiment of a network controlled vehicle of the present invention.

FIG. 1 shows a vehicle 100 that is controllable over a network. As depicted, the vehicle 100 comprises a video camera module 102 and a vehicle control module 104. The vehicle 100 is in one embodiment replicated at one-quarter scale, but may be of other scales also, including one-tenth scale, one-fifth scale, and one-third scale. Additionally, the network controlled vehicle 100 may embody scaled versions of airplanes, monster trucks, motorcycles, boats, buggies, and the like. In one embodiment, the vehicle 100 is a standard quarter scale vehicle 100 with centrifugal clutches and gasoline engines, and all of the data for the controls and sensors are communicated across the local area network. Alternatively, the vehicle 100 may be electric or liquid propane or otherwise powered. Quarter scale racecars are available from New Era Models of Nashua, N.H. as well as from other vendors, such as Danny's ¼ Scale Cars of Glendale, Ariz.

The vehicle 100 is operated by remote control, and in one embodiment an operator need not be able to see the vehicle 100 to operate it. Rather, a video camera module 102 is provided with a one or more cameras 106 connected to the vehicle control module 104 for displaying the points of view of the vehicle 100 to an operator. The operator may control the vehicle 100 from a remote location at which the operator receives vehicle control data and optionally audio and streaming video. In one embodiment, the driver receives the vehicle control data over a local area network. Under a preferred embodiment of the present invention, the video camera module 102 is configured to communicate to the operator using the vehicle control module 104. Alternatively, the video camera module 102 may be configured to transmit streaming visual data directly to an operator station.

Figure 2A:
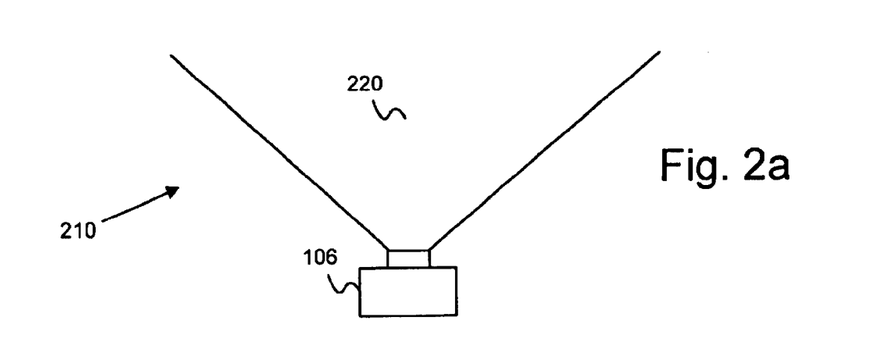
FIG. 2a is a schematic block diagram illustrating one embodiment of a two dimensional video camera module of the present invention.

FIG. 2a depicts a plan view 210 of a single camera 106 that may be mounted to the vehicle 100 as discussed in conjunction with FIG. 1. The depicted camera 106 has a specific field of view 220, delineated by the pair of angled solid lines, that is determined by the design and manufacture of the camera 106. In one embodiment, the field of view 220 is fixed and, in an alternate embodiment, the field of view 220 of the camera 106 may be dynamically adjusted using either optical or digital processes. The field of view 220 captured by the illustrated camera 106 generally produces a two dimensional image.

Figure 2B:
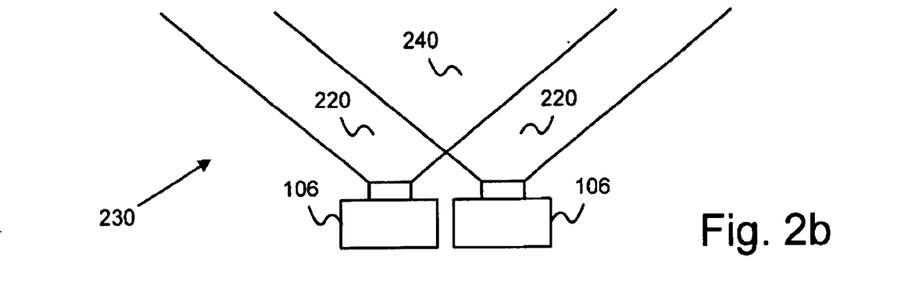
FIG. 2b is a schematic block diagram illustrating one embodiment of a three dimensional video camera module of the present invention.

FIG. 2b illustrates a plan view 230 of a pair of cameras 106 that may be co-mounted to the vehicle 100. As in the previous figure, each depicted camera 106 has a specific field of view 220. Similarly, the field of view 220 of each camera 106 in the pair may be fixed or dynamically adjustable. According to the mounting configuration, including the relational orientation of the pair of cameras 106, the fields of view 220 may wholly or partially overlap. The video camera module 102 may then process the combination of captured fields of view 220 and create a three dimensional image.

Figure 2C:
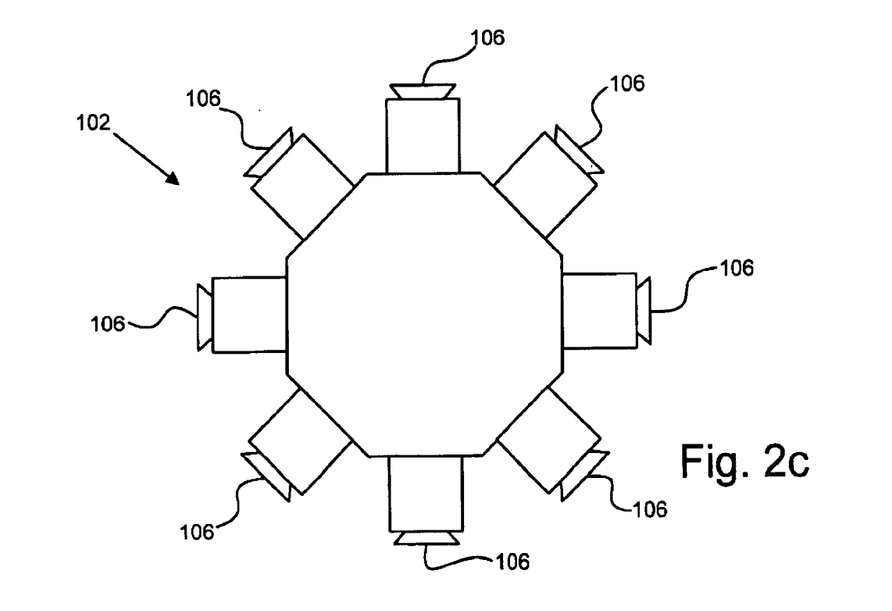
FIG. 2c is a schematic block diagram illustrating one embodiment of a 360° three dimensional video camera module of the present invention.

Referring now to FIG. 2c, shown therein is a further embodiment of the video camera module 102. The video camera module 102 of FIG. 2c comprises a plurality of video cameras 106. The cameras 14 may be mounted in a ring so as to provide a combined panoramic view created from the plurality of corresponding fields of view 220. One advantage of the present invention is the ability to form a two dimensional, three dimensional, or 360° three dimensional image. The video camera module 102 is preferably configured to weave the overlapping fields of view 220 of each camera 106. As discussed in conjunction with FIG. 2b, a three dimensional view is possible by processing two overlapping fields of view 220. Each camera 106 may be oriented so as to allow overlap of the fields of view 220 of the two cameras 106 that are closest.

Figure 3:
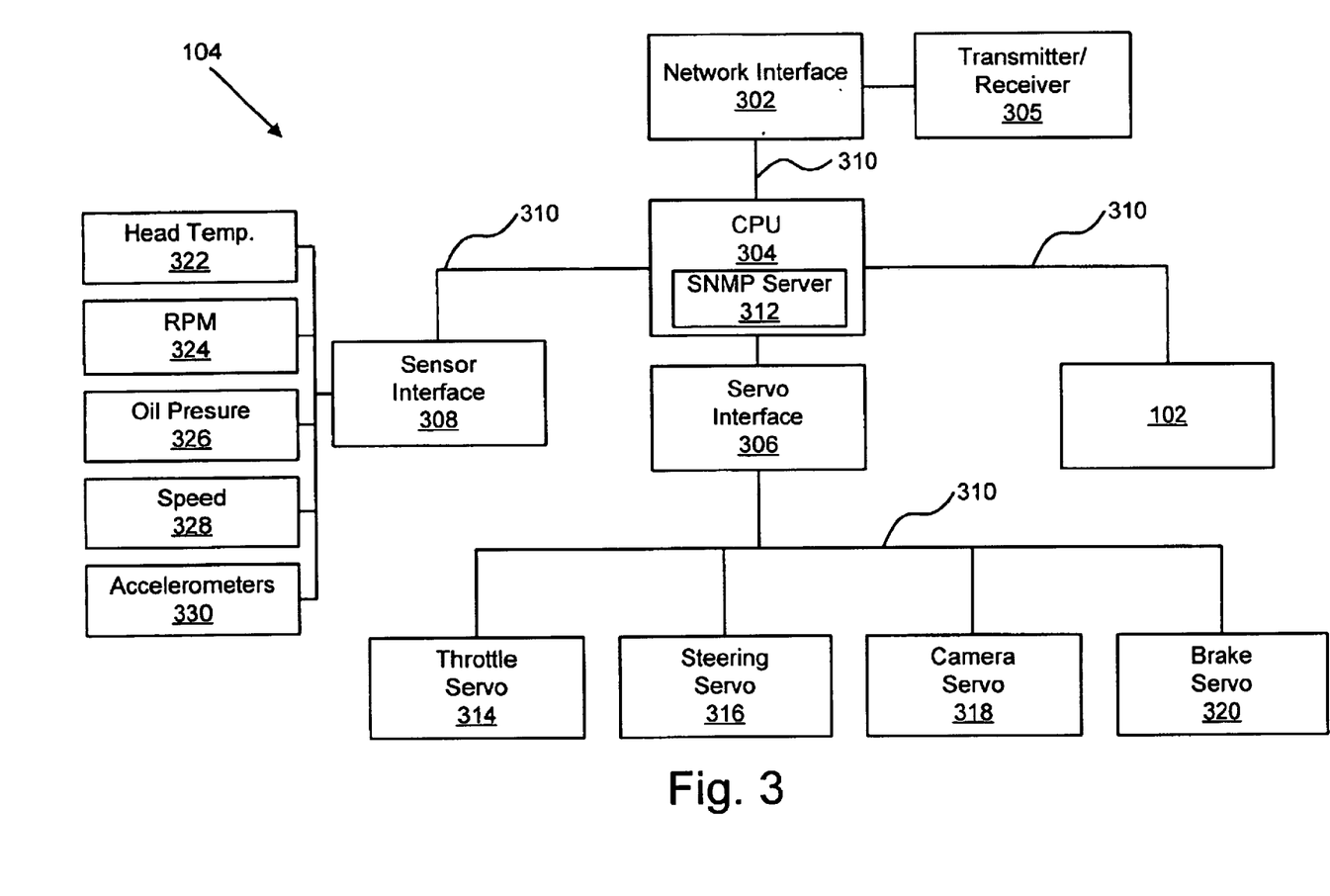
FIG. 3 is a schematic block diagram illustrating one embodiment of a vehicle control module of the present invention.

FIG. 3 shows one embodiment of the vehicle control module 104 of FIG. 1. The vehicle control module 104 preferably comprises a network interface module 302, a central processing unit (CPU) 304, a servo interface module 306, a sensor interface module 308, and the video camera module 102. In one embodiment, the network interface module 302 is provided with a wireless transmitter and receiver 305. The transmitter and receiver 305 may be custom designed or may be a standard, off-the-shelf component such as those found on laptops or electronic handheld devices. Indeed, a simplified computer similar to a Palm™ or Pocket PC™ may be provided with wireless networking capability, as is well known in the art and placed in the vehicle 100 for use as the vehicle control module 104.

In one embodiment of the present invention, the CPU 304 is configured to communicate with the servo interface module 306, the sensor interface module 308, and the video camera module 102 through a data channel 310. The various controls and sensors may be made to interface through any type of data channel 310 or communication ports, including PCMCIA ports. The CPU 304 may also be configured to select from a plurality of performance levels upon input from an administrator received over the network. Thus, an operator may use the same vehicle 100 and may progress from lower to higher performance levels. The affected vehicle performance may include steering sensitivity, acceleration, and top speed. This feature is especially efficacious in driver education and training applications. The CPU 304 may also provide a software failsafe with limitations to what an operator is allowed to do in controlling the vehicle 100.

In one embodiment, the CPU 304 comprises a Simple Network Management Protocol (SNMP) server module 312. SNMP provides an extensible solution with low computing overhead to managing multiple devices over a network. SNMP is well known to those skilled in the art. In an alternate embodiment not depicted, the CPU 304 may comprise a web-based protocol server module configured to implement a web-based protocol, such as Java™, for network data communications.

The SNMP server module 312 is preferably configured to communicate vehicle control data to the servo interface module 306. The servo interface module 306 communicates the vehicle control data with the corresponding servo. For example, the network interface card 302 receives vehicle control data that indicates a new position for a throttle servo 314. The network interface card 302 communicates the vehicle control data to the CPU 304 which passes the data to the SNMP server 312. The SNMP server 312 receives the vehicle control data and routes the setting that is to be changed to the servo interface module 306. The servo interface module 306 then communicates a command to the throttle servo 314 to accelerate or decelerate.

The SNMP server 312 is also preferably configured to control a plurality of servos through the servo interface module 306. Examples of servos that may be utilized depending upon the type of vehicle are the throttle servo 314, a steering servo 316, a camera servo 318, and a brake servo 320. Additionally, the SNMP server 312 may be configured to retrieve data by communicating with the sensor interface module 308. Examples of some desired sensors for a gas vehicle 100 are a head temperature sensor 322, a tachometer 324, an oil pressure sensor 326, a speedometer 328, and one or more accelerometers 330. In addition, other appropriate sensors and actuators can be controlled in a similar manner. Actuators specific to an airplane, boat, submarine, or robot may be controlled in this manner. For instance, the arms of a robot may be controlled remotely over the network.

Figure 4:
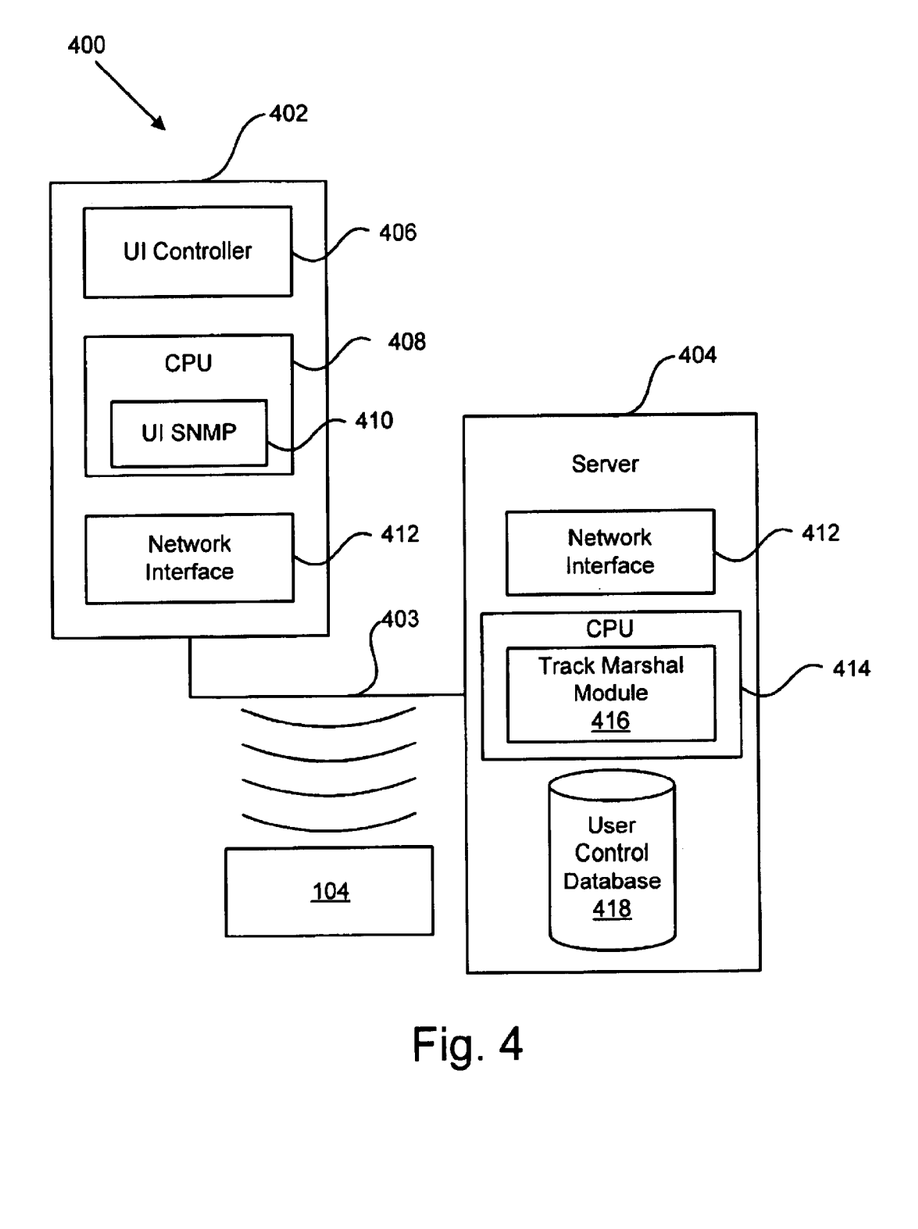
FIG. 4 is a schematic block diagram illustrating one embodiment of a network of the present invention for controlling a vehicle remotely.

Referring now to FIG. 4, shown therein is one embodiment of a network 400 for communicating with a vehicle operating under remote control. The network 400 comprises a user station 402, a data channel 403, a server 404, and a vehicle control module 104 operating within the vehicle 100 (not shown). Additionally, the network 400 may be configured to accommodate a plurality of vehicles 100. Due to the network configuration, vehicles 100 operating together need not be run on different frequencies. The IEEE 802.11 protocol, for example, provides multiple hardware addresses for a plurality of devices, or vehicles 100, on the network 400. Each vehicle 100 is thus seen as a separate device on the network and is provided with a different address. Accordingly, an advantage of the invention is that as many vehicles as are desired may be operated independently.

The user station 402 comprises a user interface (UI) controller 406, a CPU 408, a UI SNMP module 410, and a network interface connection 412. In one embodiment of the present invention, the user station 402 comprises a driving booth configured to resemble a driving compartment of a race car. Alternatively, the user station 402 may comprise a portable control device configured with a steering wheel controller, such as the Thrustmaster™ controller used for video games. In an alternative embodiment, the user station 402 may be configured in a manner patterned after traditional remote control hand held controllers. The UI controller 406 is preferably configured to interface with controls such as a steering wheel, foot pedals, gear shift, etc.

In one embodiment of the present invention, the CPU 408 is configured to communicate with the UI controller 406, the UI SNMP module 410, and the network interface connection 412. The input received from the user through the UI controller 406 is configured by the CPU 408 and the UI SNMP module 410 in order to be transmitted by the network interface 412 through the data channel 403.

In one embodiment, the data channel 403 comprises a standard Ethernet network. The configuration of the network 400 is given herein by way of example and is not to be considered limiting, as one skilled in the art will be able to readily modify the configuration while maintaining the intended functionality of the network 400.

The depicted server 404 comprises the network interface connection 412, a CPU 414, a track marshal module 416, and a user control database 418. The CPU 414 is configured to communicate with the user station 402 and the vehicle 100 through the network interface connection 412. In one embodiment, the CPU comprises a track marshal module 416 configured to monitor user operating history. The track marshal module 416 may access a user history profile that is stored on the user control database 418.

Initially, the performance level of a vehicle 100 may be limited by the track marshal module 416 in order to minimize accidents. As a user progresses in skill, the track marshal module 416 increases the performance level of the vehicle 100 until the maximum scaled performance level is achieved. Additionally, the track marshal module 416 updates the user history profile on the user control database 418. The track marshal module 416 may also be configured to override a vehicle 100 if erratic driving is detected by the CPU 414. A user may also interface with the system through the track marshal module 416 to perform one or more of the recited functions.

Figure 5:
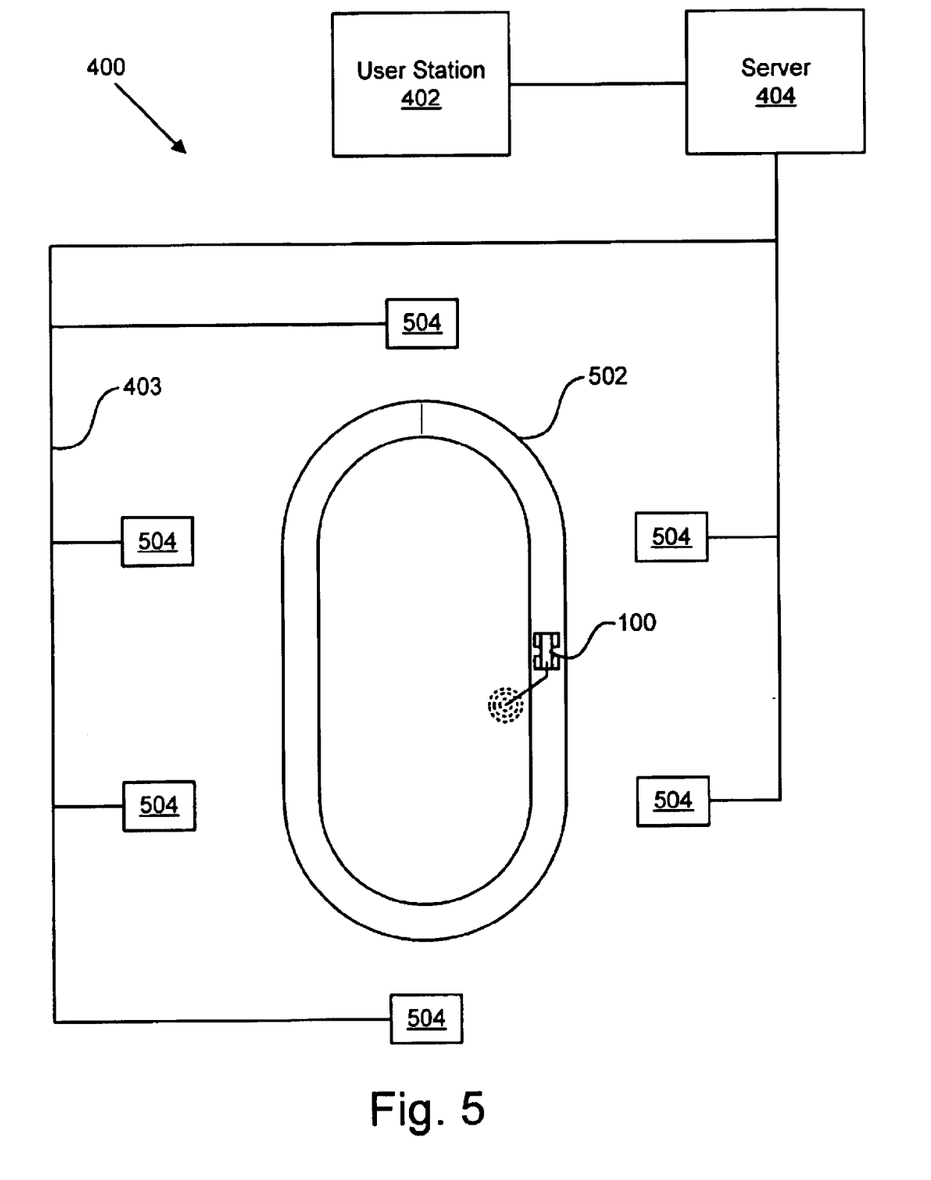
FIG. 5 is a schematic block diagram illustrating one embodiment of a network and facility of the present invention for controlling a vehicle remotely.

FIG. 5 shows one embodiment of an implementation of the network 400 at a racing track 502. The vehicle 100 may be driven in an area such as the racetrack 502 that is provided with at least one transmitter/receiver 504 distributed around the racetrack 502 for the wireless transmission and reception to and from the vehicle 100. Indeed, in the embodiment of FIG. 5, communications with the vehicle 100 are passed off between a plurality of transmitter/receivers 504. Consequently, the racing track may be of a larger size than would be practical with the limited range of current R/C cars.

Such an implementation wherein a scaled vehicle 100 communicates with the transmitter/receiver(s) 504 in order to access the server 404 is known to those skilled in the art as an infrastructure implementation of a wireless network 400. Alternatively, the network 400 may be implemented in a peer-to-peer mode wherein the vehicle 100 transmits and receives vehicle control data directly from the user station 402.

In one embodiment, both video signals and control signals are transmitted over the wireless data channels 403 using the 802.11 protocol or other protocols such as the Bluetooth protocol. However, in alternative embodiments, the control signals may be transmitted with one protocol or transmission type and the audio and video signals with another. Alternatively, vehicle control data may be embedded on a monaural channel of a video signal (i.e., in between the upper and lower channels). This signal may then be transmitted as the control signals of the vehicle 100. Control signals may also be transmitted from the vehicle 100 in addition to the audio and visual data transmitted by the video camera module 102. Such signals may be used to generate a display, including in one embodiment a heads up display, for the user. Thus, gauges or other displays may show speed, fuel, oil pressure, temperature, etc.

Figure 6:
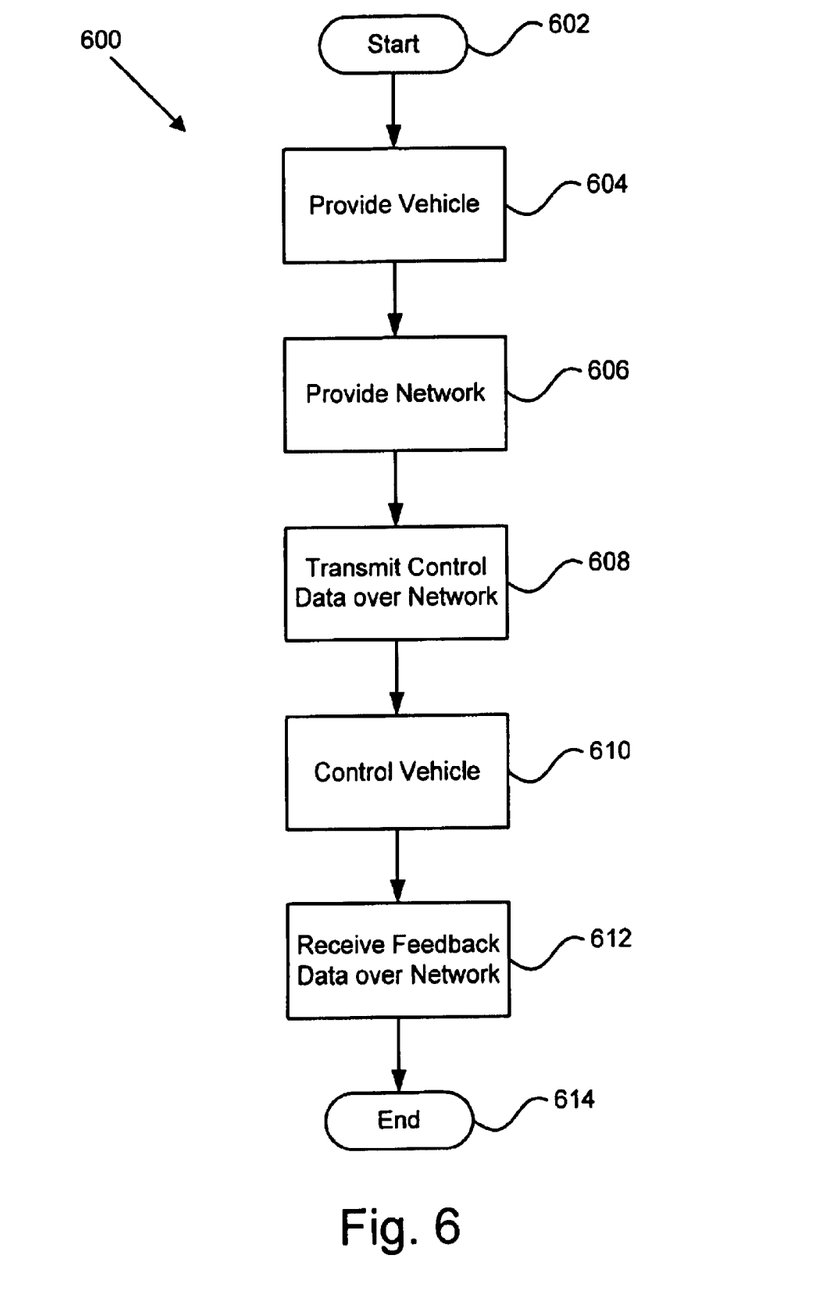
FIG. 6 is a schematic block diagram illustrating one embodiment of a method of the present invention for controlling a vehicle remotely over a network.

Referring now to FIG. 6, shown therein is a method 600 of controlling a vehicle 100 over a network 400. The method 600 starts 602 as the vehicle 100 is provided 602. Under one embodiment of the present invention, the vehicle 100 is a gas powered vehicle 100. Alternatively, the vehicle 100 may be powered by electricity or liquid propane fuel or another appropriate fuel source. Additionally, the vehicle 100 is provided 604 with the vehicle control module 104 and the video camera module 102. The network 400 is then provided 606. In one embodiment the network 400 is provided 606 with the user station 402, the server 404, and the vehicle 100 configured in the infrastructure manner discussed above. Alternatively, the network 400 is provided 606 with the vehicle 100 and a portable user station 402 configured in a peer-to-peer manner as discussed above.

Vehicle control data is then received from a user and transmitted 608 over the network 400. The vehicle control data may be transmitted 608 wirelessly and in one embodiment through standard network data channels. The vehicle 100 receives the vehicle control data and the vehicle 100 is controlled 610 in accordance with the vehicle control data. Upon request, the vehicle 100 transmits feedback data, and the server 404 receives 612 the feedback data over the network 400. The feedback data may comprise data from an accelerometer, an oil pressure sensor, a speedometer, and the like and may be displayed to a user. The method 600 ends 614 when the user finishes operating the vehicle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle controllable to move in a direction selectable remotely by a user, the vehicle comprising:

a chassis configured to move in response to vehicle control data from a user;

a controller residing within the chassis configured to receive network switched packets containing the vehicle control data; and an actuator interface module configured to operate an actuator in response to the vehicle control data received by the controller.

2. The vehicle of claim 1, wherein the controller module is configured to transmit vehicle data feedback to a user.

3. The vehicle of claim 1, wherein the actuator comprises a servo motor.

4. The vehicle of claim 1, wherein the controller module further comprises a wireless network interface connection.

5. The vehicle of claim 1, wherein the controller module is configured to transmit visual data to the user.

6. The vehicle of claim 5, wherein the controller module is configured to transmit a 360° three dimensional view to the user.

7. A station from which a vehicle is controlled remotely, the station comprising:
   a vehicle control module configured to generate vehicle control data in response to input from a user; and
   a transmission module configured to communicate with the vehicle control and transmit network switched packets containing the vehicle control data over a transmission medium to the vehicle.

8. The station of claim 7, wherein the station comprises an operator booth.

9. The station of claim 8, wherein the operator booth is configured to resemble the driving compartment of a vehicle for which the scaled vehicle is designed to resemble.

10. The station of claim 8, wherein the transmission medium comprises a network.

11. The station of claim 7, wherein the vehicle control module comprises a steering mechanism.

12. The station of claim 7, wherein the vehicle control module comprises a steering mechanism, gear shift mechanism, and acceleration control mechanism.

13. The station of claim 12, wherein the acceleration control mechanism further comprises a brake pedal, and an acceleration pedal.

14. The station of claim 7, wherein the station is embodied in a portable control device.

15. The station of claim 14, wherein the portable control device is configured to transmit and receive network switched packets in a peer-to-peer environment.

16. The apparatus of claim 14, wherein the portable control device is configured to transmit and receive network switched packets in an infrastructure environment.

17. A control apparatus for a vehicle controllable remotely over a network, the apparatus comprising:
   a network interface connection configured to transmit and receive network switched packets containing vehicle control data;
   a central processing unit configured to provide vehicle control data to the network interface connection; and
   an actuator interface module configured to receive vehicle control data from the central processing unit.

18. The control apparatus of claim 17, further comprising a video interface module configured to communicate visual data to the central processing unit.

19. The control apparatus of claim 17, further comprising a video camera configured to provide visual data to the video interface module.

20. The control apparatus of claim 19, wherein the video interface module is configured to transmit a 360° three dimensional view.

21. The control apparatus of claim 17, further comprising a Simple Network Management Protocol (SNMP) interface module residing within the central processing unit and configured to operate an actuator.

22. The control apparatus of claim 17, further comprising a web-based interface module residing within the central processing unit and configured to operate an actuator.

23. A network for communicating with a vehicle operating under remote control, the network comprising:
   at least one network interface connection; and
   a server configured to communicate network switched packets over the network with a central processing unit of a remotely controlled vehicle.

24. The network of claim 23, wherein the server is configured to communicate with a vehicle control station.

25. The network of claim 23, further comprising a wireless access point configured to communicate with a central processing unit of the mobile vehicle.

26. The network of claim 23, further comprising a vehicle performance control module configured to adjust vehicle performance parameters including speed, acceleration, braking, and steering.

27. The network of claim 26, wherein the vehicle performance control module is configured to override user controls.

28. A method of controlling a mobile vehicle over a network, the method comprising:
   providing a vehicle control module configured to transmit and receive network switched packets containing vehicle control data over a network;
   providing a central server configured to transmit and receive vehicle control data;
   transmitting vehicle control data;
   controlling the vehicle in response to the transmitted vehicle control data; and
   receiving vehicle feedback data from the vehicle.

29. The method of claim 28, wherein transmitting vehicle control data further comprises transmitting network switched packets.

30. The method of claim 29, wherein transmitting network switched packets further comprises transmitting in a peer-to-peer environment.

31. The method of claim 29, wherein transmitting network switched packets further comprises transmitting in an infrastructure environment.

32. The method of claim 28, wherein controlling the mobile vehicle further comprises controlling the mobile vehicle from within an operator booth.

33. The method of claim 28, wherein controlling the mobile vehicle further comprises controlling the mobile vehicle from a portable control device.

34. The method of claim 28, wherein the vehicle feedback data comprises vehicle performance parameters including speed, revolutions per minute (RPM), engine temperature, visual data, and audible data.

35. A computer usable medium readable by a computer, tangibly embodying a program of instructions executable by a computer to perform a method for controlling a mobile vehicle over a network, the method comprising:
   transmitting network switched packets containing vehicle control data over a digital network;
   controlling the vehicle using the control data; and
   receiving vehicle feedback data from the vehicle.

36. A vehicle controllable over a network, the vehicle comprising:
   means for moving about in response to vehicle control data from a user;
   means for transmitting and receiving network switched packets containing the vehicle control data; and
   means for operating an actuator in response to the received vehicle.

* * * * *